June 12, 1934.  A. W. ALTORFER  1,962,471
CONTROL MEANS FOR WASHING MACHINE ROLL WRINGER MECHANISM
Filed Oct. 7, 1932   5 Sheets-Sheet 3

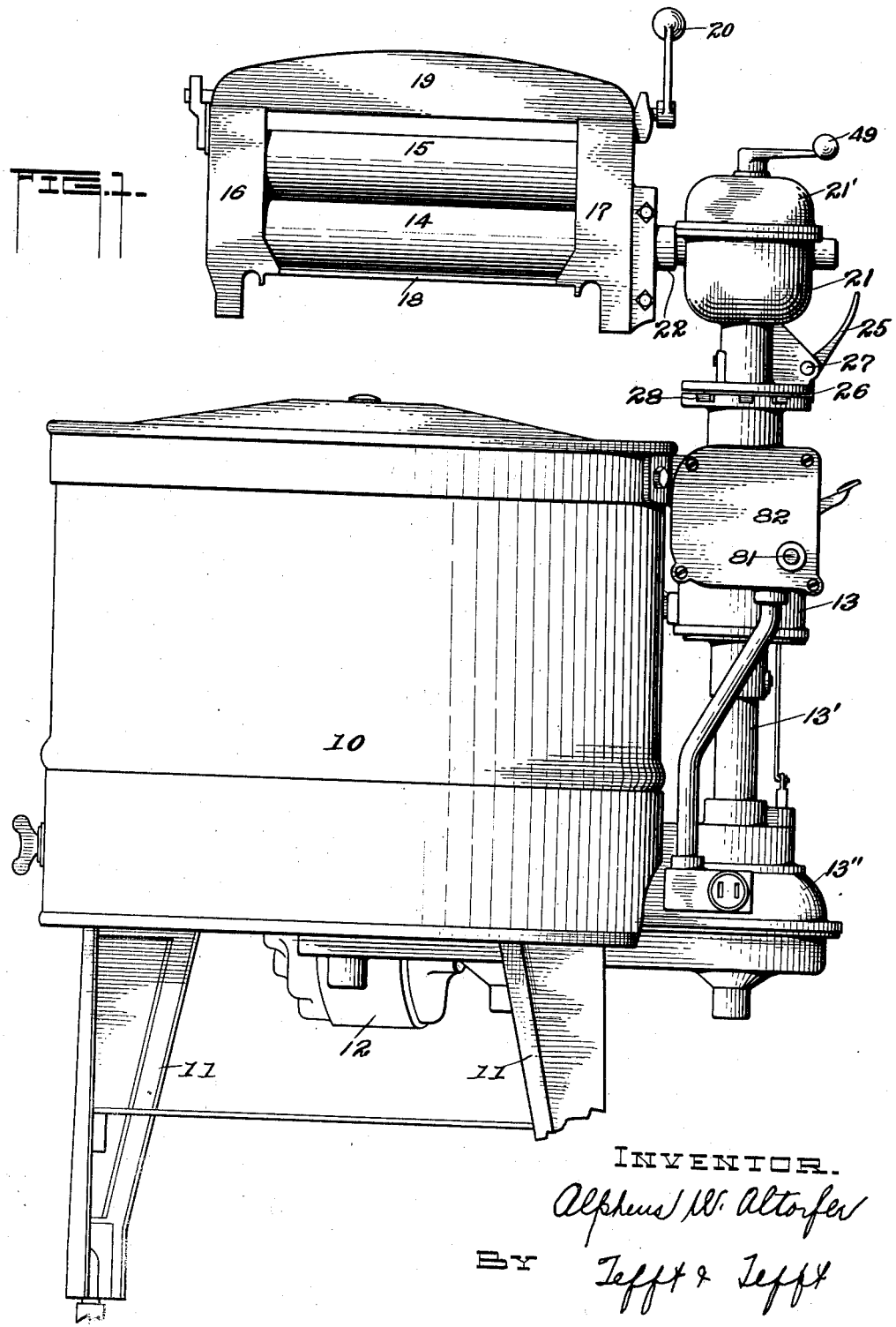

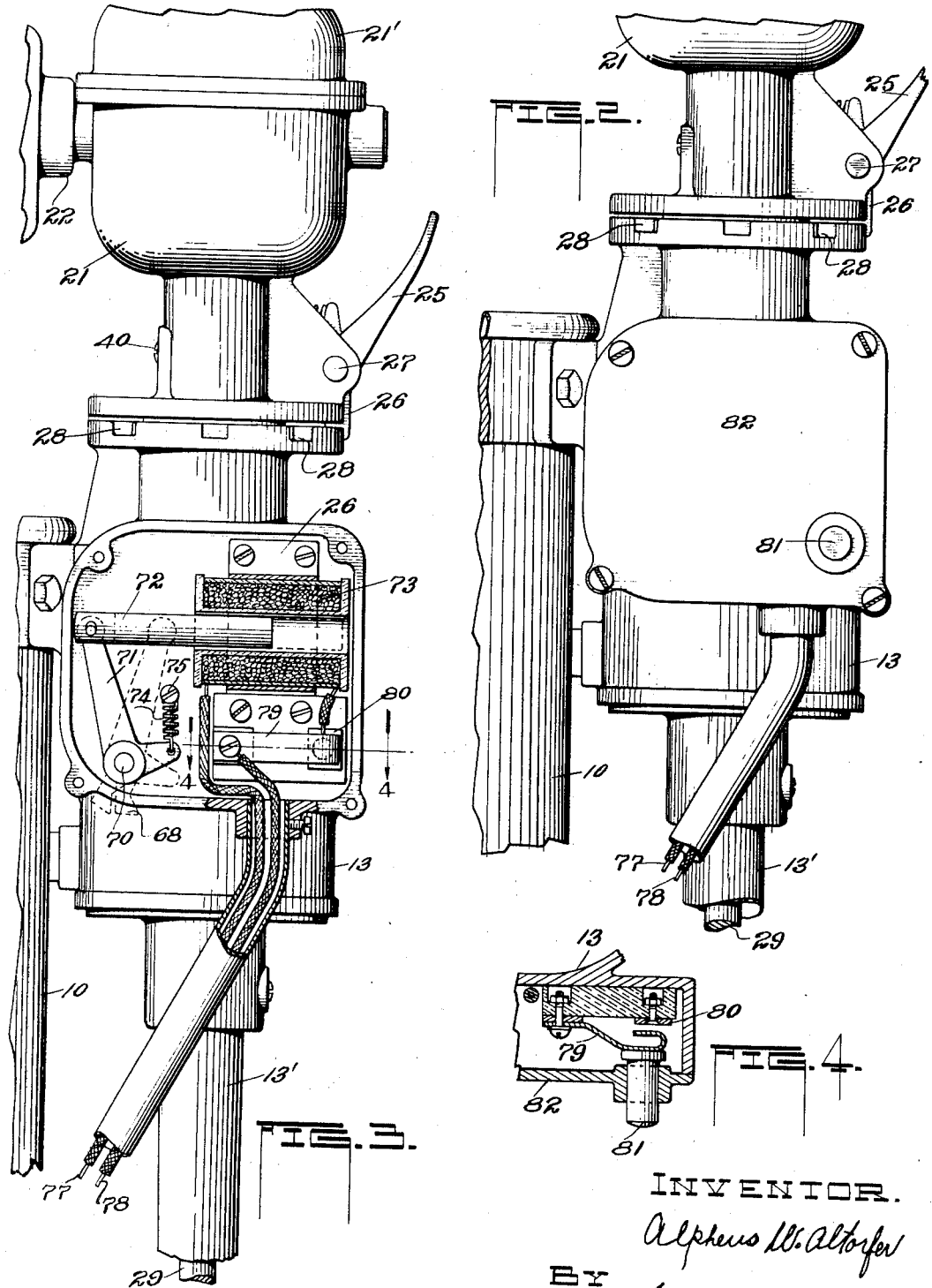

INVENTOR.
Alpheus W. Altorfer
BY Tefft & Tefft
ATTY's

June 12, 1934.　　　　A. W. ALTORFER　　　　1,962,471
CONTROL MEANS FOR WASHING MACHINE ROLL WRINGER MECHANISM
Filed Oct. 7, 1932　　　　5 Sheets-Sheet 4
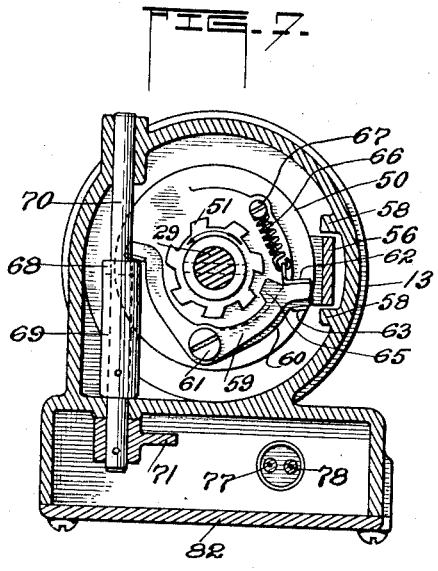
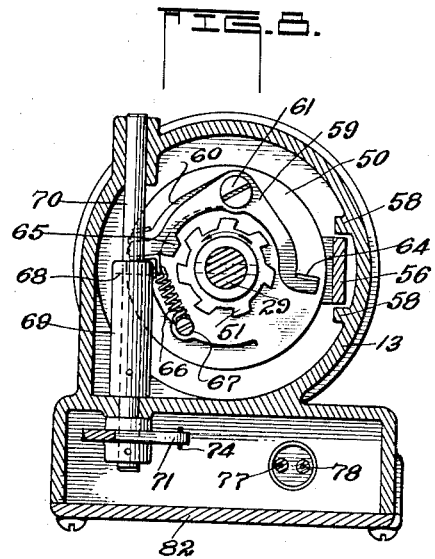
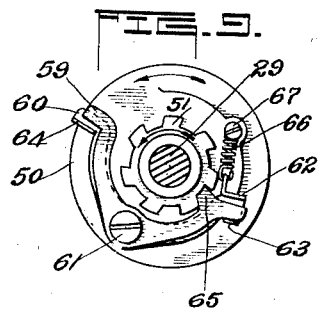
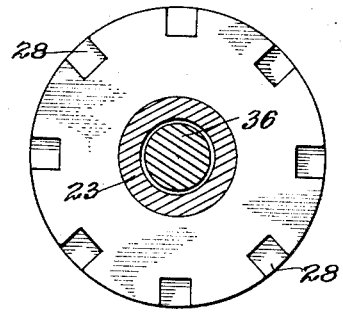
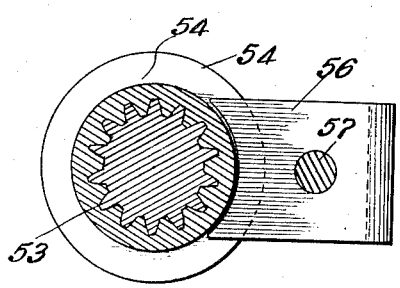
INVENTOR.
Alpheus W. Altorfer
Tefft & Tefft
BY
ATTY'S

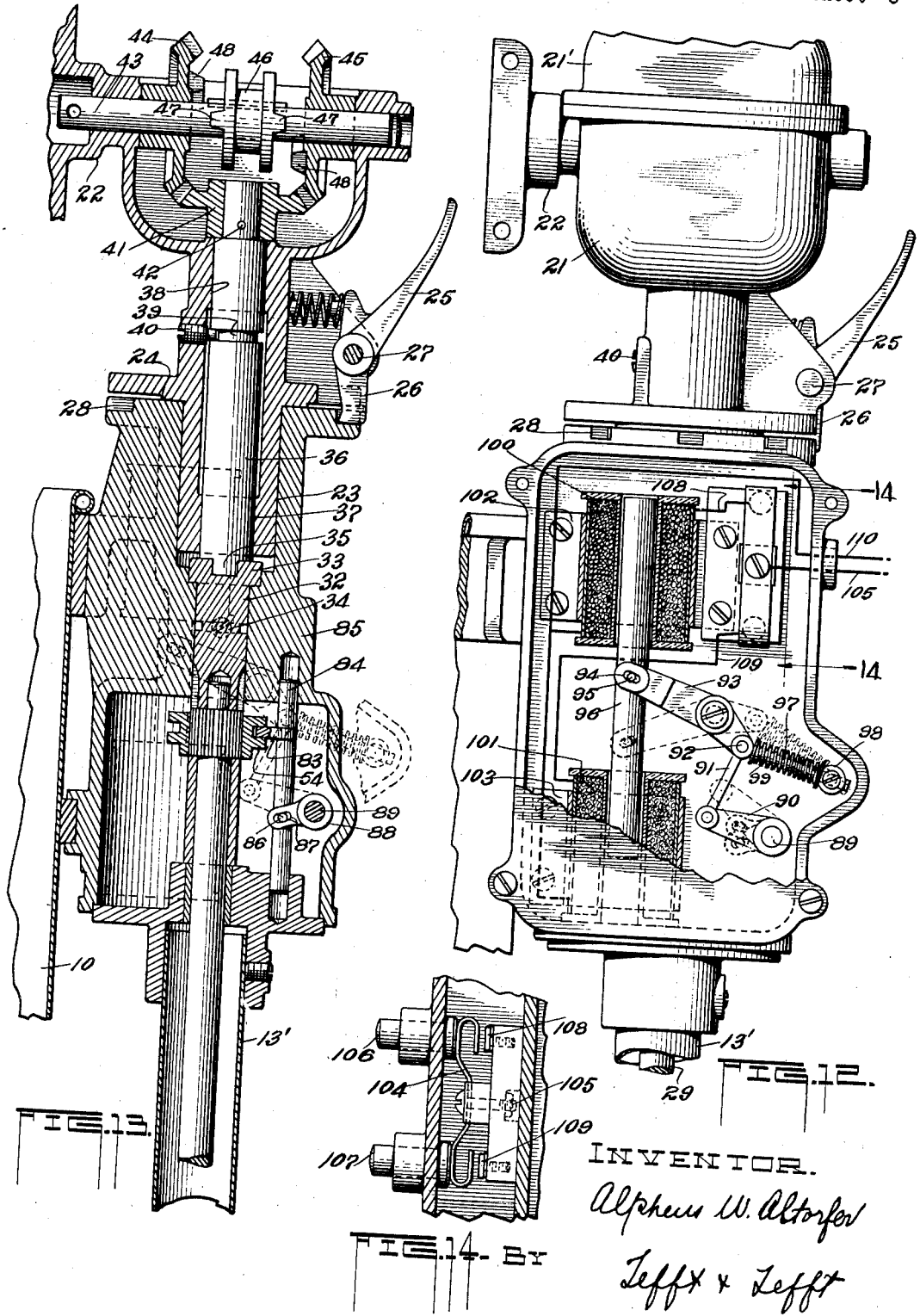

Patented June 12, 1934

1,962,471

UNITED STATES PATENT OFFICE 1,962,471

CONTROL MEANS FOR WASHING MACHINE ROLL WRINGER MECHANISM

Alpheus W. Altorfer, Peoria, Ill.

Application October 7, 1932, Serial No. 636,618

6 Claims. (Cl. 68—32)

This invention relates to control means for washing machine roll wringer mechanism.

The main object of the invention is to provide an easily operable means for controlling the wringer mechanism of a washing machine.

Another object is to provide control means for a roll wringing device, said control means including a clutch, power operated means controlling said clutch and a member operated by a comparatively slight pressure for controlling the movement of said power operated means, said control mechanism being so arranged in connection with the support and driving mechanism for the wringer as to permit the wringer to be removed from its support by simple vertical lift without disturbance to the mechanism of the wringer head or driving mechanism.

Still another object is in the provision of a control means for a roll wringing device, said control means including a power operated clutch control mechanism and an easily operated electrical switch mechanism controlling the movement of said power operated clutch control device.

Yet another object is in the provision of a control means for wringing devices including a clutch, power driven mechanism for operating said clutch, an electrical device controlling the operation of said power driven mechanism and a member operated by a comparatively slight pressure for controlling the movement of said electrical switch mechanism.

A further object is in the provision of control means for wringers including a clutch controlling the movement of the wringer, an electrical device controlling the movement of said clutch and a member operated by a comparatively slight pressure for controlling the operation of said electrical device.

A still further object is in the provision of electrically operated control means for wringers, said control means including a control member therefor operated by a comparatively slight pressure.

Yet a further object is in the provision of an electrically operated clutch control means for wringers and a manually operated member for controlling the operation of said electrical control means.

For the purpose of illustration, the invention is herein shown as embodied in a washing machine roll wringer assembly including a washing tub, a prime mover, such as an electric motor, associated washing apparatus, together with a power driven wringer unit, all mounted upon a common support. The washing and wringing mechanisms are adapted to be selectively controlled and operated, the whole forming a complete, self contained power driven washing and wringing unit.

The invention is clearly exposed in the following description and accompanying drawings, in which—

Fig. 1 is a front elevation of the complete assembly as it might appear in commerce;

Fig. 2 is an enlarged fragmentary view showing frame structure and housing supporting and covering devices of the control mechanism;

Fig. 3 is a view similar to Fig. 2 but with housing cover removed;

Fig. 4 is a sectional detail view of the electrical control switch taken on the line 4—4 in Fig. 3;

Fig. 7 is a sectional view taken on the line 7—7 in Fig. 5;

Fig. 8 is a sectional view taken on the line 8—8 in Fig. 6;

Fig. 9 is a detail view of the driving clutch control members to be referred to;

Fig. 10 is a detail view taken from the line 10—10 in Fig. 6;

Fig. 11 is a detail view taken from the line 11—11 in Fig. 5;

Fig. 12 is a sectional detail view showing the electrical control devices to be described;

Fig. 13 is a sectional detail view showing members associated with those shown in Fig. 12, the view showing detail of parts lying behind those shown in Fig. 12, with dotted outline of some overlying parts; and Fig. 14 is a detail view taken on line 14—14 in Fig. 12.

Figures 5, 6:
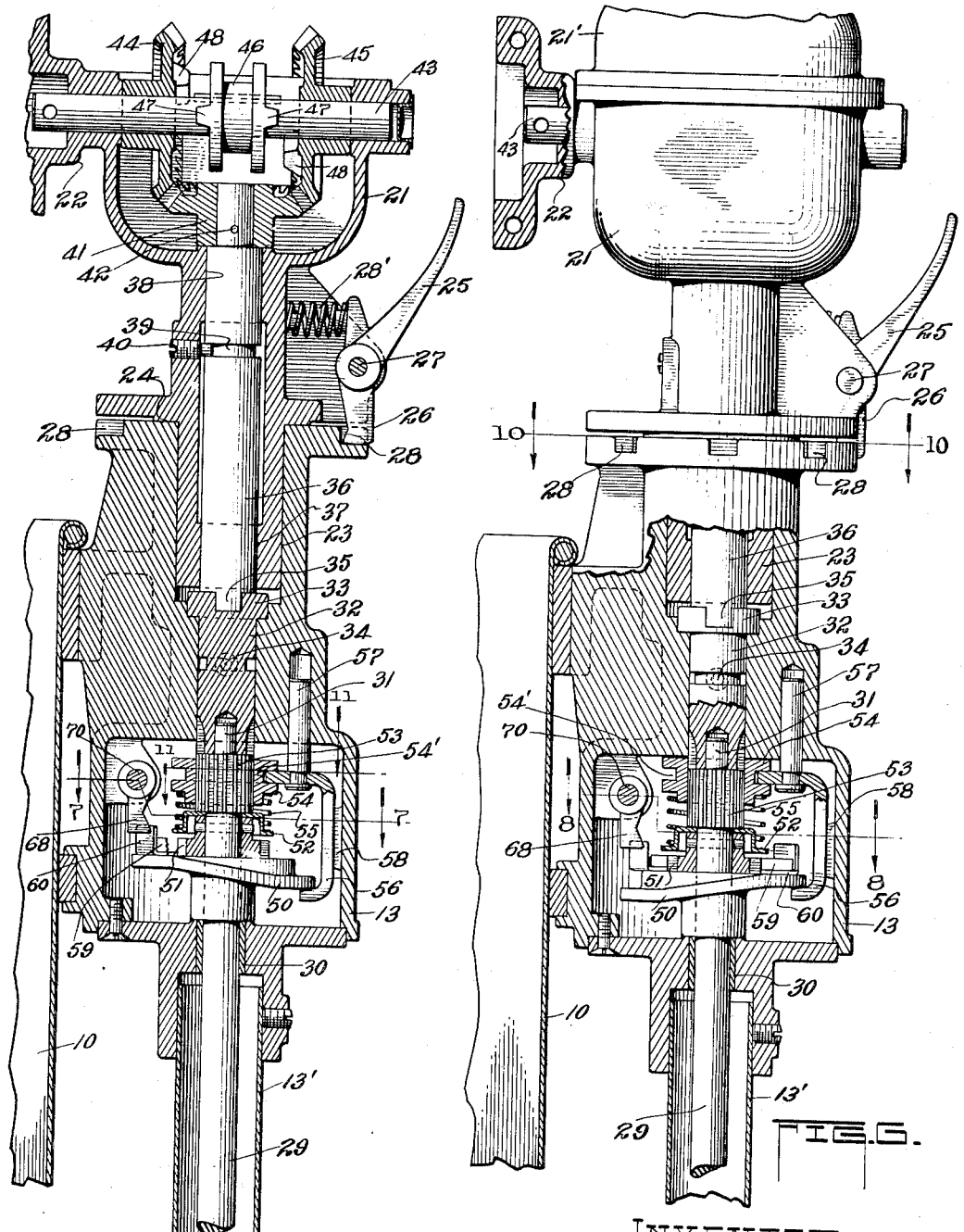
Fig. 5 is a sectional view of the wringer driving and control members showing the driving clutch in disengaged position.
Fig. 6 is a view similar to Fig. 5 but with the driving clutch in engaged position.

Fig. 1 discloses the external features of the complete assembly. The washing and wringing apparatus being of somewhat conventional design, will not be described further than to say that a tub 10 with associated washing apparatus is supported upon legs 11. Mounted upon the under side of the base portion of tub 10 is an electric motor 12. Affixed to the base and upper portions of tub 10 is a post structure made up of a lower or base housing portion 13″, a connecting tube 13′ and an upper housing portion 13 hereafter referred to as "structure 13".

The assembled structure is adapted to support and house driving and control devices to be described, also to support a wringer assembly composed of rolls 14 and 15 suitably supported in end frame members 16 and 17, which latter are joined by suitable transverse members 18 and 19.

Suitable contact pressure between rolls 14 and 15 is maintained by means housed in member 19, the said means being made operative through a hand lever 20.

The wringer unit is supported from structure 13, already noted, by means of attachment to an integral extension 22 of a housing member 21, as shown.

Housing 21 is adapted to support and enclose mechanisms to be described, also to support the wringer unit in a rotatable manner by means of a depending stem portion 23 and shouldered portion 24, the former rotatably depending within a bearing portion formed in structure 13 and the latter bearing upon the upper surface of structure 13, all as clearly shown in section in Fig. 5.

By reason of the support described, housing member 21, together with the wringer unit, may be rotated in a horizontal plane. It may be locked in any one of several positions by means of a hand lever 25 pivotally supported in housing 21 by means of a pin 27, as shown. Integral with hand lever 25 is an extension 26 which is adapted to engage in recesses 28 formed and disposed about the circumference of an upper flanged portion of structure 13, as shown in detail in Fig. 10. Extension 26 is urged toward engagement with recesses 28 by a spring 28 reacting between the body of housing 21 and an extending portion of lever 25 as shown best in Fig. 5.

Obviously, with lever 25 in locking position shown in Fig. 5, the wringer mechanism is securely locked against rotation about its support, whereas, if hand lever 25 is manipulated toward the body of housing 21 extension 26 will be withdrawn from engagement as noted, when the wringer unit may be freely rotated about the axis of bearing 23.

Through suitable mechanism, motor 12 is adapted to drive the necessary washing devices and also to rotate a vertical shaft 29, the lower end of which, not shown, is rotatably mounted in a suitable bearing within the structure 13″, the upper end being journaled in a bearing 30 formed in structure 13.

Shaft 29 extends upward and beyond bearing 30, and terminates in a shouldered and contracted portion 31 which latter is adapted to rotate within a circular cavity formed in the lower end of a stub shaft 32. Stub shaft 32 carries a shouldered portion 33 at its upper end and is adapted to rotate within a bearing portion formed in structure 13 with the shoulder 33 seated upon an annular surface provided therefor as shown in Fig. 5.

About the body portion of stub shaft 32 is a continuous groove adapted to receive a retaining screw 34 by which it is retained against upward vertical movement.

In the shouldered portion 33 is a slot 35 which is adapted to receive a flattened portion of an upright shaft 36 which is journaled in bearings 37—38 formed in the body of housing 21, as shown. A continuous groove 39 is adapted to receive a retaining screw 40 by which upward vertical movement of shaft 36 is prevented.

Downward vertical movement is prevented by the hub portion of a mitre gear 41 resting upon an annular bearing portion formed in the body of housing 21.

Mitre gear 41 is affixed to the upper end of shaft 38 by means of a pin 42. Rotatably mounted upon a horizontal shaft 43 are two mitre gears 44 and 45 disposed opposite and meshed with gear 41 as shown. Disposed between gears 44 and 45 and slidably keyed to shaft 43 is a clutch member 46 having a continuous groove about its central portion and outwardly extending tooth portions, as 47, projecting from both ends, as shown.

Tooth portions 47 are adapted to engage similar teeth as 48 which are integral with gears 44 and 45. The left hand end of shaft 43, as disposed in the several views, is adapted to be coupled, by means not shown, with the shaft of lower wringer roll 14.

Clutch member 46 is adapted to be shifted from a central or neutral position into engagement with either of gears 44 or 45 by means of a hand lever conveniently located atop a cap member 21, the hand lever having a stem which is journaled in a bearing formed in the body of cap member 21′.

To the inner end of the stem is affixed an eccentric member which is adapted to engage in the groove of clutch member 46 in such a manner that manipulation of hand lever 49 will result in a shifting movement of the clutch 46 from neutral position into engagement with gear 44 or 45 as already noted.

The foregoing description will illustrate that rotation of shaft 36, together with gear 41, will result in idling rotation, in opposite direction, of gears 44 and 45 and that selective directional rotation may be transmitted to shaft 43 and wringer assembly by manipulation of hand lever 49 to engage clutch 46 with gear 44 or 45.

It may be noted here that the entire wringer head assembly may easily be removed from structure 13 by a simple vertical lift which will withdraw stem portion 23 of housing 21 and disengage the separable coupling between stub shaft 32 and shaft 36.

Actuation of shaft 36 is effected in the following manner:

It has been noted that shaft 29 is normally rotated, through suitable mechanism, by the motor 12 and that said shaft extends upwardly from bearing 30 into a housing portion of structure 13 and terminates in a contracted portion and shoulder, which latter lies adjacent the lower end of stub shaft 32.

Figs. 5 and 6 disclose that, resting upon the inner face of bearing member 30 and rotatably mounted upon shaft 29 is a cam member 50, above which is affixed a ratchet member 51 supporting a flanged thimble member 52, above which is affixed a pinion member 53. Stub shaft 32 is provided, at its lower end, with teeth similar to those of pinion 53.

Slidably mounted upon pinion 53 is a clutch ring member 54 having a continuous groove 54′ formed about the periphery and a bore broached with teeth which complement those of pinion 53 as shown best in Fig. 11.

Views shown in Figs. 5 and 6 will indicate that clutch ring 54 is adapted to slide upon pinion 53 up and into engagement with the toothed portion of stub-shaft 32 and thereby form a coupling between shaft 29 and stub shaft 32. The ring 54 is shown in disengaged position in Fig. 5 and in engaged position in Fig. 6.

A compression spring 55, reacting between the flanged portion of thimble 52 and the under side of the flanged portion of clutch ring 54 tends to urge ring 54 toward engagement with stub shaft 32, which movement is limited by engagement of a lip portion of a sliding member 56 engaging within the groove 54'. Sliding member 56 is retained in proper alignment with associated parts by means of a rigidly affixed stud member 57 which is slidably supported within a circular cavity formed in the body of structure 13, as shown. Rotation of member 56 about the axis of stud 57 is prevented by lug portions 58 formed integral with structure 13, as best shown in Figs. 7 and 8. A lower lip portion of member 56 is adapted to engage against the under side of cam 50 and is retained in follow-up contact therewith by the spring 55 through clutch ring 54, as shown.

Figs. 5 and 6 will illustrate that cam 50 is so formed that when it is positioned as shown in Fig. 5, its lowest side is in contact with the lower lip of sliding member 56, the effect of which is to hold clutch ring 54 out of engagement with stub-shaft 32, whereas rotation of cam 50 through 180 degrees will present the high side to sliding member 56, allowing spring 55 to propel clutch ring 54 into engagement, thus forming a coupling between shaft 29 and stub-shaft 32, as shown in Fig. 6. Obviously, further rotation of cam 50 through 180 degrees will restore the several parts to the disengaged position shown in Fig. 5.

Controlled actuation of cam 50 is accomplished as follows:

Figs. 7, 8 and 9 will disclose two levers 59 and 60, with lever 59 assembled to overlie lever 60 and both pivotally mounted upon the upper side of cam 50 by means of a screw 61, as shown. Lever 59 is provided at one end with a tooth portion 65, which is adapted to engage with ratchet 51, as shown in Fig. 9.

Lever 60 is provided, at one end, with an upstanding lip portion 64, and on the opposite end with similar lips 62 and 63. The lips mentioned are adapted to engage, with a certain amount of free play between them, the ends of lever 59, as shown. Lever 60 is tensioned by an extension spring 66, hooked to an extending portion of lip 62 and anchored to the body of cam 50 by means of a screw 67. Acting through lever 60 and lip 63, spring 66 tends to urge tooth 65 of lever 69 into engagement with ratchet 51.

It may be mentioned here that for practical purposes lever 60 is not necessary and might be omitted without affecting the practical operation of the device. In case of such omission, spring 66 would be hooked direct to lever 69. The object of the supplementary lever 60 is to allow a certain amount of loose recoil movement on the part of lever 69 at the instant of its escape from loaded condition. The arrangement described provides for smoother and less noisy operation.

Referring to Fig. 9, is will be clear that, with the several parts positioned as shown, if lever 60 is rotated upon screw 61 in a clockwise direction, lips 64 and 62 will engage and rotate lever 69 to withdraw tooth 65 from engagement with ratchet 51. It will also be clear that, with ratchet 51 rotating as shown by the arrow, unitary rotation of cam 50 will be imparted through tooth 65, lever 59 and screw 61.

Obviously, with the parts in rotation as above, contact of either end of lever 60 with a stationary object will result in rotation of lever 60, together with lever 59, upon the screw 61 to withdraw tooth 65 from engagement as described, which in turn will result in arrestment of rotation of cam 50, while ratchet 51 is free to continue rotation. It will be clear that removal of the obstructing object will permit spring 66 to re-engage tooth 65 with ratchet 51 and resume rotation of cam 50.

The described clutching mechanism is operated and utilized in the following manner:

Figs. 5, 6, 7 and 8 will disclose a stop member 68 depending from a hub portion 69, which is affixed to a shaft 70 rotatably mounted, as shown, in suitable bearings formed in the body of structure 13.

As shown in Figs. 5 and 6, stop member 68 is normally disposed in position to engage and obstruct either of lips 62 or 64. Dotted lines in Fig. 3 will indicate that stop 68 may be withdrawn from the obstructive position through rotation of shaft 70, which movement will allow escapement of, for example, lip 64 and engagement of tooth 65 with ratchet 51. Under practical working conditions, removal of stop 68 from obstructive position would be but momentary, in other words, the stop would be removed and retained out of contact with lip 64 for a moment, after which it would be returned to the normal obstructive position. Such action will allow lip 64 to escape and rotate, as described, while stop 68 has in the meantime returned to the normal obstructive position. The described rotation will obviously continue until lip 62 is obstructed by stop 68, when the parts will rest as shown in Fig. 8. Momentary removal of stop 68, as described, will permit escapement of lip 62, re-engagement of clutch and rotation of cam 50 until lip 64 is obstructed, when the parts will rest in the position shown in Fig. 7. Thus, each operation of stop 68 will result in rotation of cam 50 through 180 degrees. The contour of cam 50 is so adjusted with relation to lips 62 and 64 that on one side stop 68 is effective to arrest cam 50 in the position shown in Fig. 5, while the opposite side is adjusted to arrest cam 50 in the position shown in Fig. 6.

Manual control of the described clutch operating means is accomplished by the following means:

Referring to Fig. 3, it will be noted that a bell crank lever 71 is affixed to the extending end of shaft 70. To the long arm of lever 71 is pivotally attached an armature member 72, which is adapted to operate within a solenoid coil 73, the latter being suitably supported upon structure 13 by means of a bracket 76 as shown. An extension spring 74 is hooked to the short arm of lever 71 and anchored to structure 13 by means of a screw 75.

As illustrated in Fig. 3, the stop member 68 is so adjusted with relation to the armature 72 that when the armature is withdrawn through the action of spring 74, stop member 68 will be in a position to engage either of lips 62 or 64, as described, whereas energizing of coil 73 will result in propulsion of armature 72 to rotate lever 71, together with stop member 68, into a non-engaging position with relation to lips 62 or 64.

Coil 73 may be energized by power flowing through lines 77 and 78, the circuit being controlled by a series switch composed of a contact spring 79, contact block 80 and a push button 81, as shown in detail in Fig. 4. The switch assembly is suitably affixed to structure 13 with button 81 projecting through cover 82, as shown in Fig. 2.

In view of the foregoing description, it will be apparent that rotation of wringer rolls 14 and 15 by power from driving shaft 29 may be controlled by momentary manipulation of push button 81 to energize coil 73, attract and move armature 72 to rotate lever 71 and withdraw stop 68 from obstructive engagement with lips 62 or 64, the above movements resulting in rotation of cam 50 in half revolution steps to actuate sliding member 56 as described, to propel clutch ring 54 into or out of engagement with stub shaft 32, as described.

It is thought that the foregoing description, together with the drawings referred to, will clearly illustrate the structure and function of the several elements composing my invention as indirectly controlled through the combination of electrical and mechanical means.

A variation of the control means is illustrated in Figs. 12, 13 and 14 of the accompanying drawings, wherein the driving and clutching means are identical with those already described but where the control means is directly operated through electrical and mechanical devices, as follows:

Fig. 13 discloses that clutch ring 54 may be engaged by an extending portion 83 of a vertical plunger member 84, which is slidably supported in circular cavities formed in structure 85. It will be noted that the extension 83-shaft 84 unit replaces sliding member 56 and that structure 85 replaces structure 13, both as formerly referred to. Plunger member 84 is provided with a stud 86 which is adapted to engage in a slot 87 formed in a lever 88, the latter being rotatably supported upon a stud 89 which is affixed to structure 85. Integral with lever 87 is a lever 90, best shown in Fig. 12. Pivotally attached to the arm of lever 90 is a link 91, the opposite end of which is pivotally attached, by means of a stud 92 to the short arm of a rocking lever 93. The long arm of lever 93 is provided with a slot 94 which is adapted to engage a stud 95 attached to an armature member 96. Pivotally supported upon stud 92 is a link member 97, the opposite end of which is pivotally supported by means of a screw 98 affixed to structure 85.

A compression spring 99 is suitably retained upon link 97, to react in toggle relation between the stationary stud 98 and the end of the lever 93 to retain the latter in either of the rotated positions shown in solid and dotted lines.

Armature 96 is adapted to slide within, and be actuated by, either of solenoid coils 100 or 101, which are disposed as shown in Fig. 12 and attached to structure 85 by means of brackets 102 and 103, as shown. Energization of coil 100 will result in upward movement of armature 96 and consequent movement of lever 93, link 91, levers 90 and 88, shaft 84 and extension 83, to propel clutch ring 54 upwardly into clutched engagement with stub shaft 32. Spring 99 tends to retain lever 93 and associated mechanism in the assumed position after coil 100 has been de-energized, thus maintaining the clutched relation described until coil 101 is energized, when armature 96 will be propelled downwardly into coil 101 with consequent movement of the described mechanism to place and retain clutch ring 54 in de-clutched position.

Electric power for energizing solenoids 100 and 101 is selectively supplied through a switch assembly such as is shown in Fig. 14, wherein a common contact spring 104 connected to line 105 is adapted, by means of push buttons 106 and 107, to supply current to either of coils 100 or 101 through lines 108 or 109, the circuits being completed through the common line 110.

Operation of the latter described assembly may be summarized as follows:

Slight manual pressure on push button 106 will complete the circuit of line 105, 108, coil 100 and line 110, energizing coil 100 to cause engagement of clutch ring 54 as described. Similar manipulation of push button 107 will complete the circuit of line 105, 109, coil 101 and line 110, energizing coil 101 to cause disengagement of clutch 54 as described. Thus, the clutching means is effectively operated by simple manipulation of push buttons 106 and 107.

What I claim is:

1. The combination of a roll wringing mechanism for a washing machine, means for driving the rolls of said mechanism, a clutch in the driving mechanism, power means for operating the clutch to control the movement of the wringer rolls, an electrical device controlling said power means and a manually operated member for controlling said electrical device, said member being responsive to a relatively slight pressure by the operator.

2. The combination of a roll wringing mechanism for a washing machine, means for driving the rolls of said mechanism, a clutch in the driving mechanism, means for operating the clutch to control the movement of the wringer rolls, said means including an electrically operated device and a manually operated member for controlling said electrically operated device, said member being responsive to a comparatively slight pressure by the operator.

3. The combination of a roll wringing mechanism for a washing machine, means for driving the rolls of said mechanism, a clutch in the driving mechanism and electrically operated mechanism for operating the clutch to control the movement of the wringer rolls, said electrically operated mechanism being responsive to a comparatively slight pressure by the operator.

4. The combination of a roll wringer mechanism for a washing machine, means for driving the rolls of said mechanism, a clutch in the driving mechanism, and mechanism for operating the clutch to control the movement of the wringer rolls, said mechanism including solenoid mechanism responsive to a comparatively slight pressure by the operator.

5. The combination of a roll wringer mechanism for washing machines, mean for driving the rolls of said mechanism, a clutch in the driving mechanism, means for operating the clutch to control the movement of the wringer rolls, said means including a solenoid mechanism and a manually operated member for controlling said solenoid, said member being responsive to a comparatively slight pressure by the operator.

6. The combination of a roll wringer mechanism for washing machines, means for driving the rolls of said mechanism, a clutch in the driving mechanism and magnetically operated mechanism for operating the clutch to control the movement of the wringer rolls, said magnetically operated mechanism being responsive to a comparatively slight pressure by the operator.

ALPHEUS W. ALTORFER.